(12) United States Patent
Choi et al.

(10) Patent No.: US 10,689,057 B2
(45) Date of Patent: Jun. 23, 2020

(54) BICYCLE FRAME HAVING LUG

(71) Applicants: HYUNDAI MOTOR COMPANY, Seoul (KR); KIA Motors Corporation, Seoul (KR)

(72) Inventors: Jungnam Choi, Seongnam-si (KR); Sung Dae Lim, Gunpo-si (KR)

(73) Assignees: KIA MOTORS CORPORATION, Seoul (KR); HYUNDAI MOTOR COMPANY, Seoul (KR)

( * ) Notice: Subject to any disclaimer, the term of this patent is extended or adjusted under 35 U.S.C. 154(b) by 157 days.

(21) Appl. No.: 15/817,845

(22) Filed: Nov. 20, 2017

(65) Prior Publication Data

US 2019/0016408 A1 Jan. 17, 2019

(30) Foreign Application Priority Data

Jul. 11, 2017 (KR) .................. 10-2017-0087969

(51) Int. Cl.
| B62K 19/30 | (2006.01) |
| B62K 19/36 | (2006.01) |
| B62K 19/34 | (2006.01) |
| B62K 19/32 | (2006.01) |
| B62K 19/18 | (2006.01) |
| B62K 19/20 | (2006.01) |

(52) U.S. Cl.
CPC .............. B62K 19/30 (2013.01); B62K 19/18 (2013.01); B62K 19/20 (2013.01); B62K 19/32 (2013.01); B62K 19/34 (2013.01); B62K 19/36 (2013.01)

(58) Field of Classification Search
None
See application file for complete search history.

(56) References Cited

U.S. PATENT DOCUMENTS

| 582,138 | A | * | 5/1897 | Hedenburg | ........... C04B 37/026 |
| | | | | | 403/272 |
| 4,479,662 | A | * | 10/1984 | Defour | ................ B62K 19/22 |
| | | | | | 280/281.1 |
| 4,583,755 | A | * | 4/1986 | Diekman | ............... B62K 19/22 |
| | | | | | 280/281.1 |
| 6,270,104 | B1 | * | 8/2001 | Nelson | ................. B29C 70/446 |
| | | | | | 280/281.1 |
| 6,742,796 | B2 | * | 6/2004 | Ho | ........................ B62K 19/00 |
| | | | | | 280/281.1 |
| 10,184,522 | B2 | * | 1/2019 | Swarthout | ............ B21D 26/033 |
| 2005/0161898 | A1 | * | 7/2005 | Chao | ..................... B62K 15/00 |
| | | | | | 280/278 |
| 2016/0223022 | A1 | * | 8/2016 | Swarthout | ............ B21D 26/033 |

FOREIGN PATENT DOCUMENTS

KR 10-2011-0023604 A 3/2011

* cited by examiner

*Primary Examiner* — Jacob D Knutson
*Assistant Examiner* — Harold Eric Pahlck, III
(74) *Attorney, Agent, or Firm* — McDonnell Boehnen Hulbert & Berghoff LLP

(57) ABSTRACT

The present disclosure is directed to a bicycle frame having a lug that is connected with a tube. The lug may be produced by shaping and bonding at least two plates.

12 Claims, 8 Drawing Sheets

BICYCLE FRAME HAVING LUG

CROSS-REFERENCE TO RELATED APPLICATION

This application claims priority to and the benefit of Korean Patent Application No. 10-2017-0087969 filed in the Korean Intellectual Property Office on Jul. 11, 2017, the entire contents of which are incorporated herein by reference.

BACKGROUND OF THE DISCLOSURE

(a) Field of the Disclosure

The present disclosure relates to a bicycle frame, and more particularly, to a bicycle frame having a lug that is bonded to a tube in a bicycle frame to connect tubes.

(b) Description of the Related Art

A conventional bicycle frame includes a head tube, a seat tube, a top tube, a down tube, a seat stay, and a chain stay.

A steering handle connector is connected at the upper end of the head tube, a front wheel rotation connector is connected at the lower end thereof, a saddle connector is connected at the upper end of the seat tube, and a chain driving body is connected at the lower end thereof.

The top tube and the down tube connect and support the head tube and the seat tube, and the seat stay and the chain stay connect and support a rear wheel rotation connector and the seat tube.

The bicycle frame may have both the top tube and the down tube, but in some cases, one main tube (not shown) may be connected between the head tube and the seat tube.

A conventional bicycle frame is produced by cutting and welding each of a top tube, a down tube, and a seat tube using a tube as a basic material. Because production automation thereof is difficult, productivity may be deteriorated and production costs may increase.

Therefore, nowadays, in order to produce a bicycle frame, research has been conducted for improving productivity of the bicycle frame by hot stamping and laterally bonding a plate.

Further, a method of producing a bicycle frame includes a method of directly bonding tubes, a method of bonding (brazing) tubes using a lug, and a method of integrally producing a tube using a carbon composite material.

In a method of directly bonding tubes and a method of bonding (brazing) tubes using a lug, in order to improve matching and bonding between pipes, a metering process is required. Such a metering process is performed according to a model, a specification, and a size.

A lug for most bicycles is produced through a casting process, and a production time of a casting process is long. Upon rapid cooling, contraction of the lug may occur, and the casting process requires a relatively high cost. Further, after a casting process, a process of removing a foreign substance is further required, and for a casting process, the degree of freedom of a shaping form is low.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide a bicycle frame having a lug having advantages of being capable of reducing a production cost, reducing occurrence of quenching contraction, and improving productivity by enhancing a bonding structure and a form of a lug that is connected with a tube by replacing a casting lug.

An exemplary embodiment of the present invention provides a bicycle frame having a lug that is connected with a tube, wherein the lug is produced by shaping and vertically or laterally bonding at least two plates.

The tube may include a head tube, a top tube, a down tube, a seat tube, a chain stay, or a seat stay.

The tube may be produced by one of the following methods: extrusion, drawing, tube forming, or hydroforming.

The tube comprises a top tube and a down tube, and the lug may include a head lug that is bonded to a front end portion of the top tube and to a front end portion of the down tube and that forms a head tube, and the head lug may include a head lug left plate and a head lug right plate bonded to the head lug left plate.

In the lug, an exterior diameter reduction portion having a reduced exterior diameter may be formed, and an insertion portion formed in an end portion of the exterior diameter reduction portion that is inserted into the tube.

The tube comprises a seat tube and a top tube and the lug may include a seat tube lug into which the seat tube is vertically penetrated and that is connected with the top tube at a front side and connected with two seat stays at a rear side.

The tube further comprises a seat stay and the bicycle frame may further include a seat stay lug that connects a rear end of the seat tube lug and a front end portion of two seat stays.

The seat stay lug may include a seat stay lug upper plate and a seat stay lug lower plate that is bonded to the seat stay lug upper plate.

The tube comprises a seat tube, a down tube and a chain stay, and the lug may include a bottom lug connected with a lower end of the seat tube, a rear end of the down tube and with two chain stays at a rear side.

The bicycle frame may further include a chain stay lug that connects the rear side of the bottom lug and a front end portion of two chain stays.

The chain stay lug may include a chain stay lug upper plate and a chain stay lug lower plate that is bonded to the chain stay lug upper plate.

The bottom lug may include a bottom lug left plate and a bottom lug right plate that is bonded to the bottom lug left plate.

One hole is formed at a front side of the seat stay lug, the hole being bonded to the seat tube lug, and another hole is formed at a rear side of the seat stay lug and corresponds to a front end portion of two seat stays.

One hole is formed at a front side of the chain stay lug, the hole bonded to the bottom lug, and two further holes formed at a rear side of the chain stay lug, two holes corresponding to a front end portion of two chain stays.

The at least two plates may be butt bonded or may be welded in a partially overlapped state.

Another embodiment of the present invention provides a lug that is engaged with a tube and that is produced by shaping and bonding each of at least two plates.

An exterior diameter reduction portion having a reduced exterior diameter to the tube side may be formed, and an insertion portion that is inserted into the tube is formed in an end portion of the exterior diameter reduction portion.

Holes may be formed at one side and another side of the lug and the plates divide the holes in half.

DETAILED DESCRIPTION OF THE EMBODIMENTS

Figure 1:
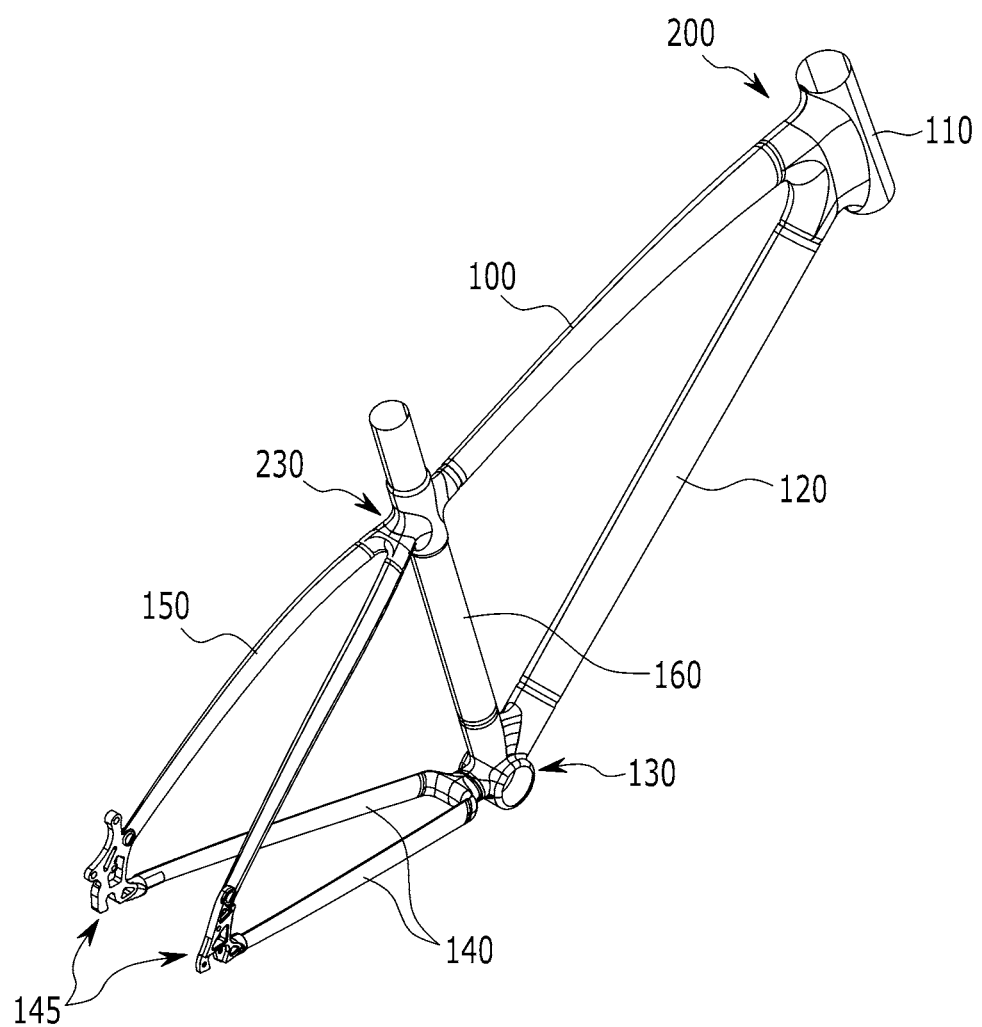
FIG. 1 is a perspective view illustrating a bicycle frame having a lug according to an exemplary embodiment of the present invention.

Hereinafter, an exemplary embodiment of the present invention will be described in detail with reference to the accompanying drawings.

Further, in the drawings, the size and thickness of each element are randomly represented for better understanding and ease of description. The present invention is not limited thereto and the thickness of several portions and areas are exaggerated for clarity.

The drawings and description are to be regarded as illustrative in nature and not restrictive. Like reference numerals designate like elements throughout the specification.

In the following description, terms such as a first and a second used in names of constituent elements are used for distinguishing constituent elements having the same name and do not limit order thereof.

FIG. 1 is a perspective view illustrating a bicycle frame having a lug according to an exemplary embodiment of the present invention.

Referring to FIG. 1, the bicycle frame includes a head tube 110, a top tube 100, a down tube 120, a seat tube 160, a seat stay 150, a chain stay 140, a drop out 145, a head lug 200, and a seat tube lug 230 as major constituent elements.

The head lug 200 is formed by laterally coupling two shaped plates to the head tube 110 and is bonded to the front end portion of the top tube 100 and the down tube 120. Here, one plate forms a half-circle portion of one side of the head tube 110, and the other plate forms the remaining half-circle portion of the head tube 110.

The seat tube 160 vertically penetrates the seat tube lug 230, the front side thereof is bonded to the rear end of the top tube 100, and the rear side thereof is bonded to a front end portion of the seat stay 150. Here, the seat tube lug 230 may be produced by laterally coupling two shaped plates to the seat tube 160, as in the head lug 200.

The front side of a bottom lug 130 is bonded to the rear end of the down tube 120, and the rear side thereof is bonded to a front end portion of the chain stay 140.

The drop out 145 is bonded to the rear end of each of the seat stays 150 and the chain stays 140. An insertion portion (not shown) is formed in the drop out 145 into which a central shaft of a wheel is inserted.

The present disclosure relates to a coupling structure of a lug that is connected with a tube. Contents of well-known technology are included in a specification, and a detailed description thereof will be omitted.

Figure 2:
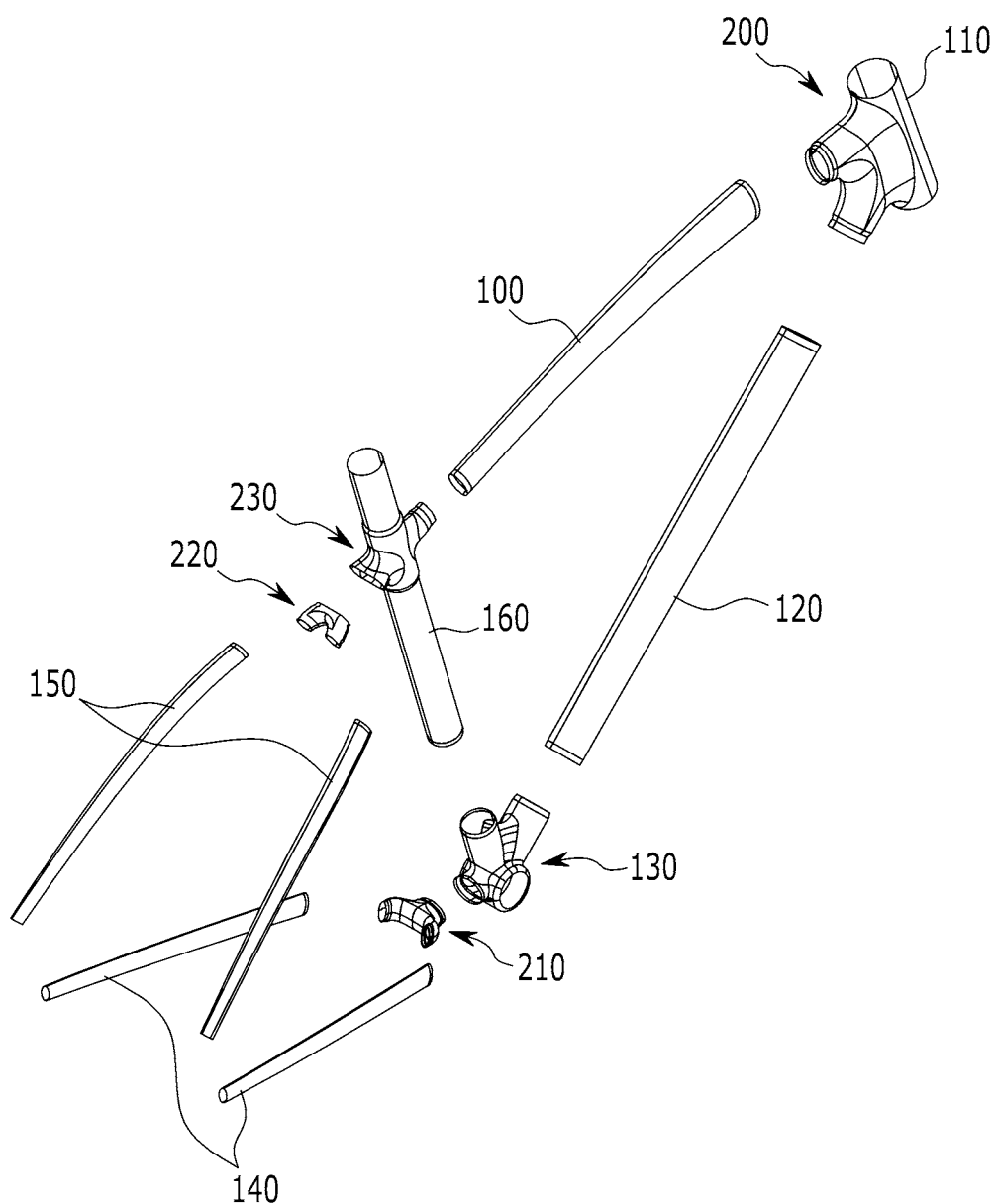
FIG. 2 is a partially exploded perspective view illustrating a bicycle frame having a lug according to an exemplary embodiment of the present invention.

FIG. 2 is a partially exploded perspective view illustrating a bicycle frame having a lug according to an exemplary embodiment of the present invention, and differences from the frame of FIG. 1 will be described.

Referring to FIG. 2, a seat stay lug 220 is disposed between the seat stay 150 and the seat tube lug 230. That is, the seat stay lug 220 connects the seat tube lug 230 and the seat stay 150.

A front end portion of the seat stay lug 220 is bonded to the seat tube lug 230, and a rear end portion of the seat stay lug 220 is bonded to each of two seat stays 150.

Further, a chain stay lug 210 is disposed between the chain stay 140 and the bottom lug 130. That is, the chain stay lug 210 connects the chain stay 140 and the bottom lug 130.

A front end portion of the chain stay lug 210 is bonded to the bottom lug 130, and a rear end portion of the chain stay lug 210 is bonded to each of two chain stays 140.

Figure 3:
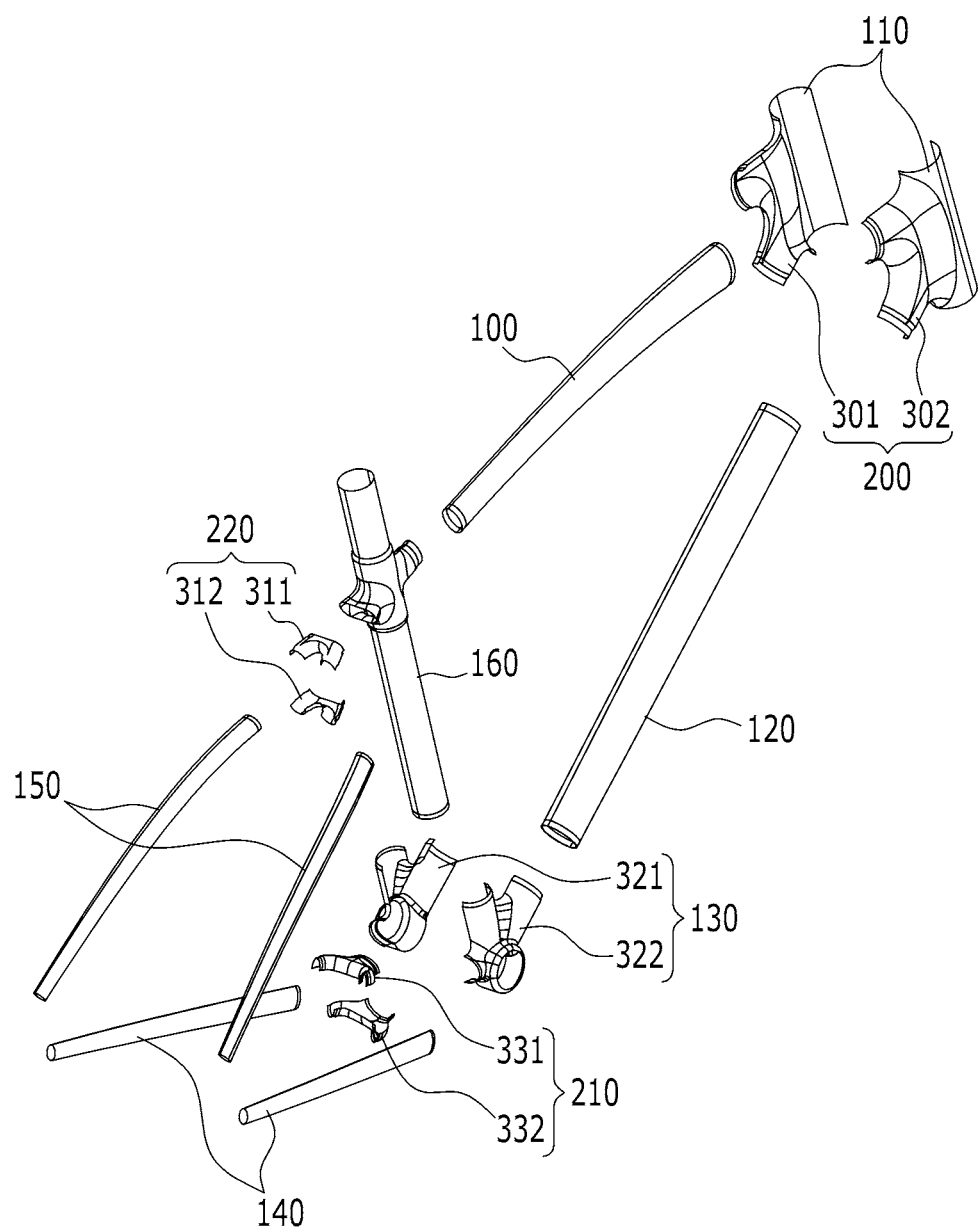
FIG. 3 is an exploded perspective view illustrating a bicycle frame having a lug according to an exemplary embodiment of the present invention.

FIG. 3 is an exploded perspective view illustrating a bicycle frame having a lug according to an exemplary embodiment of the present invention, and differences from the frames of FIGS. 1 and 2 will be described.

Referring to FIG. 3, the head lug 200 includes a head lug left plate 301 and a head lug right plate 302. The head lug left plate 301 and the head lug right plate 302 each are produced by shaping one plate. The head lug 200 is completed by bonding the head lug left plate 301 and the head lug right plate 302. The head tube 110 is also integrally formed together therewith.

Figure 4:
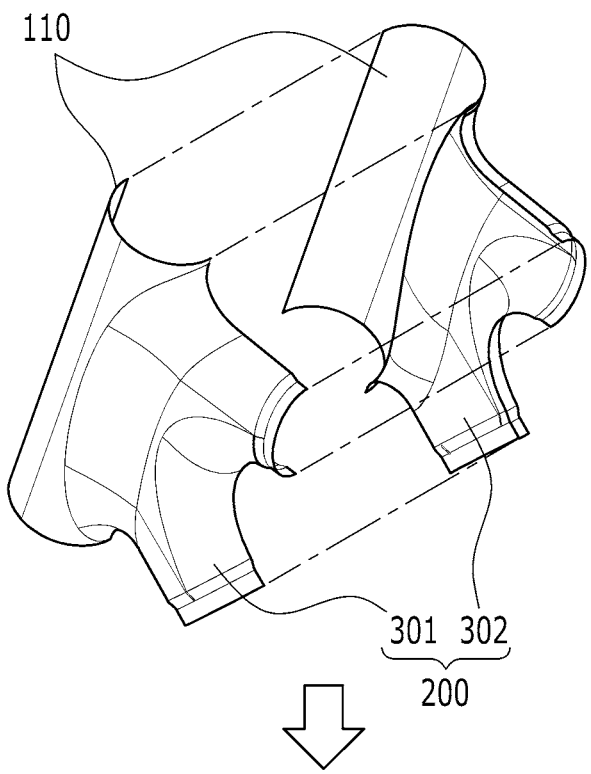
FIG. 4 is an exploded and coupled perspective view of a head lug according to an exemplary embodiment of the present invention.
Figure 4:
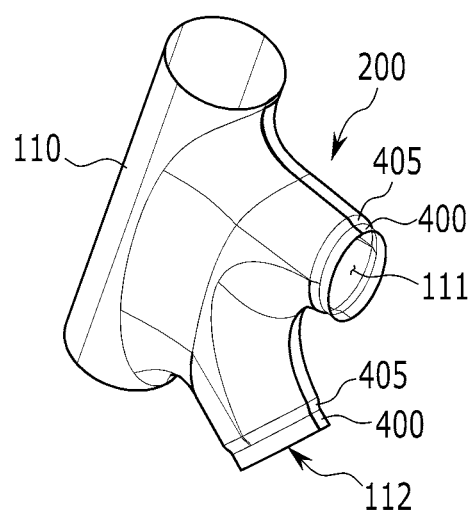

FIG. 4 is an exploded and coupled perspective view of a head lug according to an exemplary embodiment of the present invention.

Referring to FIG. 4, the head lug 200 includes a head lug left plate 301 and a head lug right plate 302 that are produced by shaping a plate. The head lug 200 is completed by the head tube 110 being integrally formed by butt bonding the head lug left plate 301 and the head lug right plate 302.

The head lug 200 includes a head tube 110 that is vertically formed at the front side. At the rear end, a pipe hole 111 that is connected with the top tube 100 is formed. At a lower portion of the rear end, a pipe hole 112 that is connected with the down tube 120 is formed.

Further, an exterior diameter reduction portion 405 and an insertion portion 400 are formed in a circumferential direction to correspond to the diameter of the pipe hole 111 of the head lug 200. The insertion portion 400 is inserted into the top tube 100. The exterior diameter reduction portion 405 has a reduced exterior diameter toward the insertion portion 400.

Figure 5:
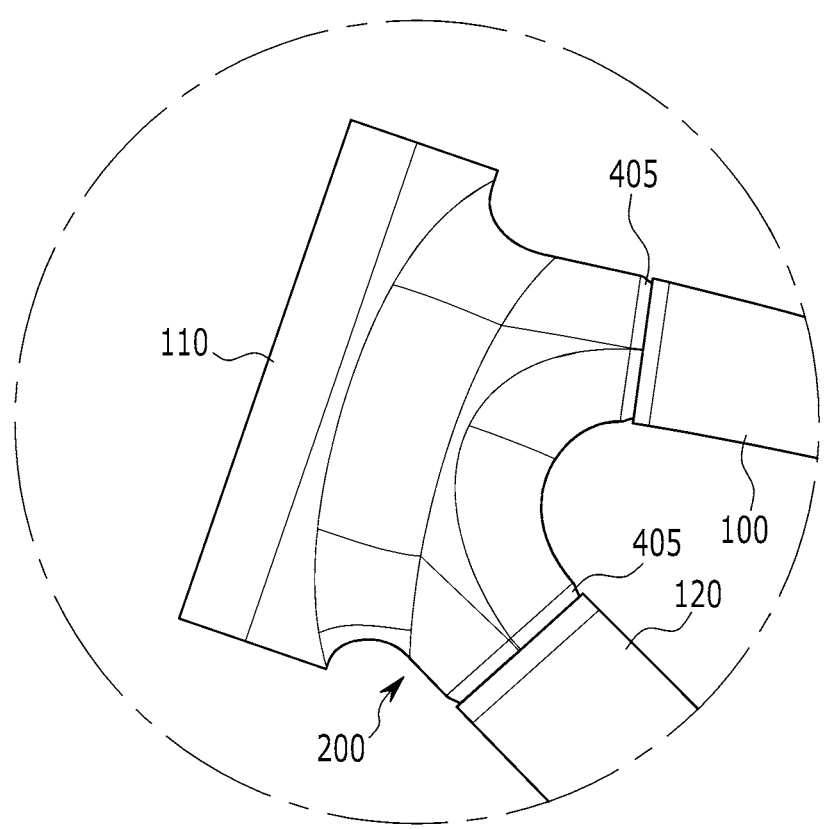
FIG. 5 is a side view illustrating a coupling state of a head lug and a tube according to an exemplary embodiment of the present invention.

FIG. 5 is a side view illustrating a coupled state of a head lug and a tube according to an exemplary embodiment of the present invention.

Referring to FIG. 5, the head lug 200 is coupled to each of the top tube 100 and the down tube 120. The top tube 100 and the down tube 120 are each inserted into a respective insertion portion of the head lug 200. The exterior diameter reduction portion 405 forms a groove for welding.

Figure 6:
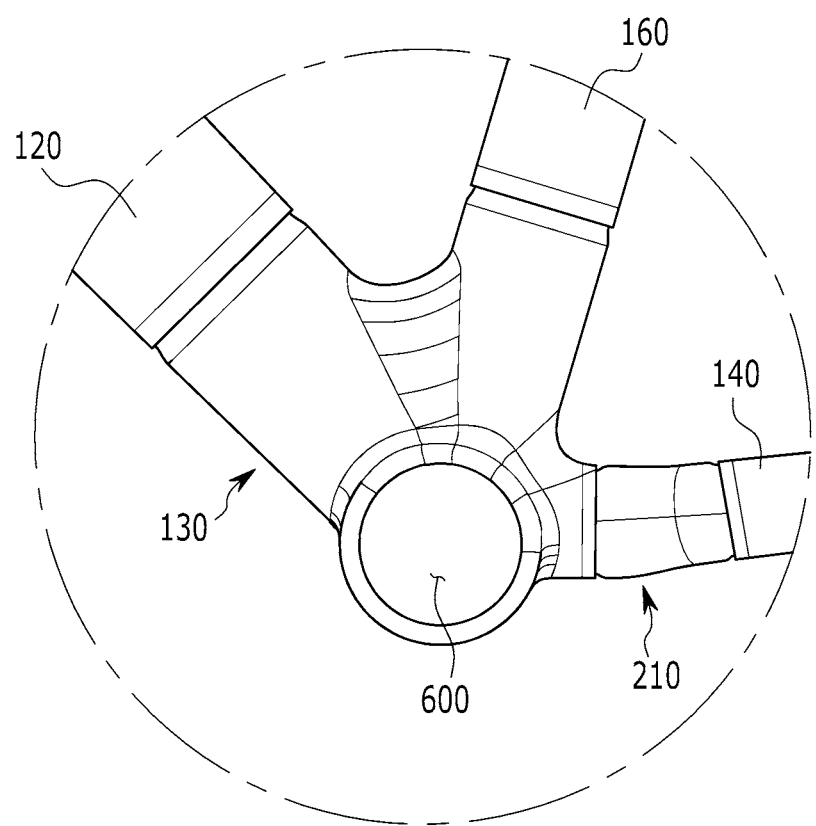
FIG. 6 is a side view illustrating a coupling state of a bottom lug and a tube according to an exemplary embodiment of the present invention.

FIG. 6 is a side view illustrating a coupled state of a bottom lug and a tube according to an exemplary embodiment of the present invention.

Referring to FIG. 6, the bottom lug 130 is engaged with the rear end of the down tube 120 at an upper portion of the front side, is engaged with the front end of the chain stay 140 through the chain stay lug 210 at the rear side, and is engaged with the lower end of the seat tube 160 at the upper side.

Here, each of the down tube 120 and the seat tube 160 may be inserted into the bottom lug 130. A front end portion of the chain stay lug 210 may be inserted into the bottom lug 130. A groove may be formed along an insertion portion (not shown), and a welding portion may be formed along the groove.

In the bottom lug 130, a laterally penetrating shaft insertion hole 600 is formed. The formation of the shaft insertion hole 600 does not require a specific design specification. A motor driving device may be attached to the bottom lug 130.

Figure 7:
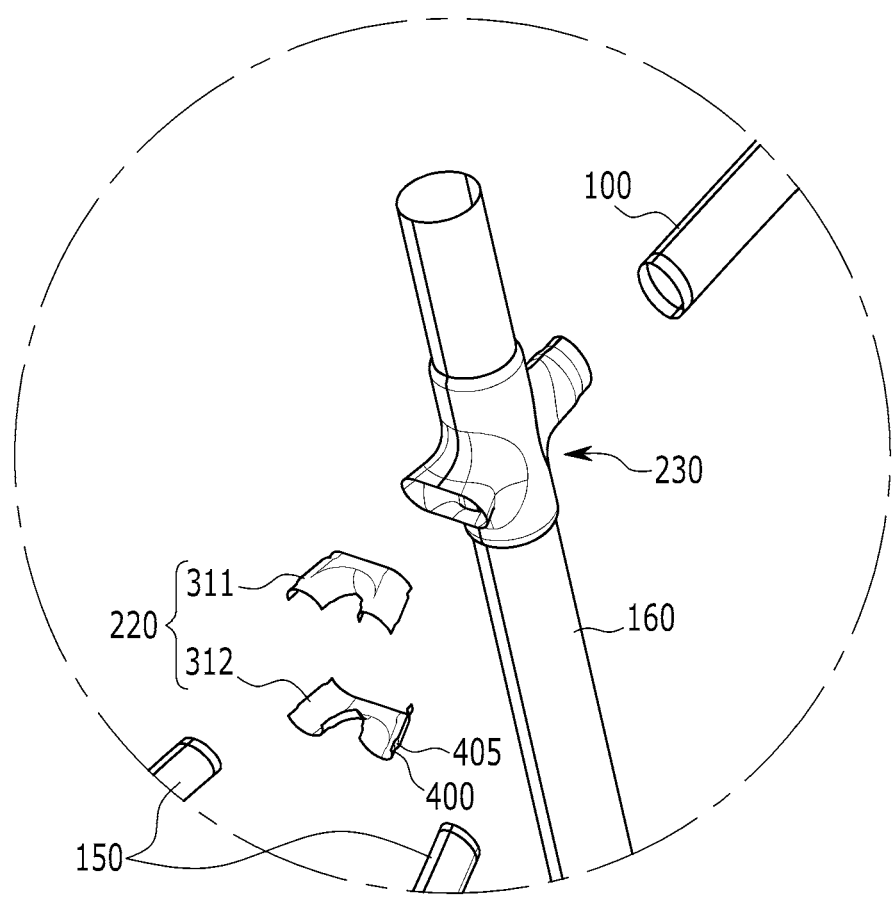
FIG. 7 is a partially exploded perspective view illustrating a seat tube lug according to an exemplary embodiment of the present invention.

FIG. 7 is a partially exploded perspective view illustrating a seat tube lug according to an exemplary embodiment of the present invention.

Referring to FIG. 7, the seat stay lug 220 includes a seat stay lug upper plate 311 and a seat stay lug lower plate 312. The seat stay lug upper plate 311 and the seat stay lug lower plate 312 are each formed by shaping one plate.

Further, the seat stay lug upper plate 311 and the seat stay lug lower plate 312 are bonded to form two pipe holes (not shown) that are coupled to the seat stay 150 at the rear end and to form one pipe hole (not shown) that is coupled to the seat tube lug 230 at the front end.

Figure 8:
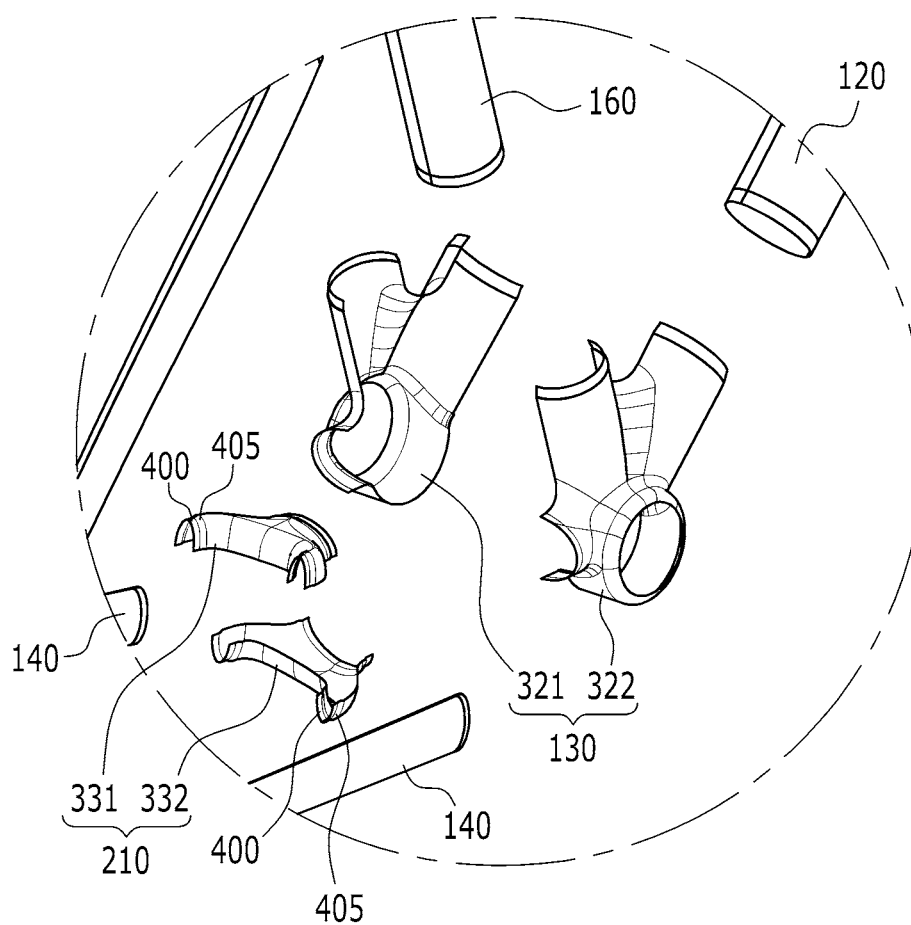
FIG. 8 is a partially exploded perspective view illustrating a bottom lug according to an exemplary embodiment of the present invention.

FIG. 8 is a partially exploded perspective view illustrating a bottom lug according to an exemplary embodiment of the present invention.

The bottom lug 130 includes a bottom lug left plate 321 and a bottom lug right plate 322. The bottom lug left plate 321 and the bottom lug right plate 322 are each produced by shaping one plate.

Further, the bottom lug left plate 321 and the bottom lug right plate 322 are bonded to each other and form one pipe hole at the upper side of the front side, one pipe hole at an upper portion, and one pipe hole at the rear side.

The chain stay lug 210 includes a chain stay lug upper plate 331 and a chain stay lug lower plate 332. The chain stay lug upper plate 331 and the chain stay lug lower plate 332 are each produced by shaping one plate.

Further, the chain stay lug upper plate 331 and the chain stay lug lower plate 332 are bonded each other to form two pipe holes that are coupled to the chain stay 140 at the rear end and one pipe hole that is coupled to the bottom lug 130 at the front end.

Referring again to FIG. 8, in the chain stay lug 210, one hole is formed in a central portion of the front side and two holes are formed at both sides of the rear side. The chain stay lug upper plate 331 and the chain stay lug lower plate 332 are horizontally divided and thus divide the three holes in half. The plates 331 and 332 are vertically bonded to each other.

Through a process that forms the lug 200, 130, 210, 220, or 230 by shaping and bonding two plates, productivity can be improved, maintenance can be easily performed, and the production cost can be reduced.

Particularly, the head lug 200 is integrally formed with the head tube 110 and is connected with and bonded to the top tube 100 and the down tube 120.

The bottom lug 130 performs a function of a bottom bracket, a front end portion thereof is bonded to the down tube 120, an upper end portion thereof is bonded to the seat tube 160, and a rear end portion thereof is connected with the chain stay 140 through the chain stay lug 210. Here, the chain stay lug 210 connects the bottom lug 130 and the chain stay 140.

The seat tube lug 230 provides a penetration hole in which the seat tube 160 vertically penetrates and is bonded to an exterior surface of the seat tube 160. The front end of the seat stay lug 220 is bonded to the seat tube lug 230, and the rear end thereof is bonded to the seat stay 150.

Each of the tubes 100, 120 and 160 may be produced by an extrusion, drawing, tube forming, or hydroforming method.

In a bicycle frame having a lug according to the present disclosure, a bonding structure and a form of a lug that is connected with a tube by replacing a casting lug can be enhanced.

Further, the production cost of a bicycle frame can be reduced, contraction of a quenching lug can be reduced, and more various forms of lugs and bicycle frames can be produced.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A bicycle frame having a plurality of lugs connected with a plurality of tubes, wherein the plurality of lugs are produced by shaping and vertically or laterally bonding at least two plates, wherein the plurality of tubes comprise a head tube, a top tube, a down tube, a seat tube, a chain stay, and a seat stay;
   wherein one of the plurality of lugs comprises a bottom lug connected with a lower end of the seat tube, a rear end of the down tube, and with the chain stay at a rear side;
   wherein the bicycle frame further comprises a chain stay lug that connects the rear side of the bottom lug and a front end portion of the chain stay; and
   wherein the chain stay lug comprises a chain stay lug upper plate and a chain stay lug lower plate that is bonded to the chain stay lug upper plate.

2. The bicycle frame of claim 1, wherein the plurality of tubes are produced by one of the following methods: extrusion, drawing, tube forming, or hydroforming.

3. The bicycle frame of claim 1,
   wherein one of the plurality of lugs comprises a head lug that is bonded to a front end portion of the top tube and to a front end portion of the down tube and that forms a head tube, the head lug comprising a head lug left plate and a head lug right plate bonded to the head lug left plate.

4. The bicycle frame of claim 1, further comprising:
   an exterior diameter reduction portion having a reduced exterior diameter formed in each of the plurality of lugs, and
   an insertion portion formed in an end portion of the exterior diameter reduction portion that is inserted into each of the plurality of tubes.

5. The bicycle frame of claim 1, wherein
   one of the plurality of lugs comprises a seat tube lug into which the seat tube is vertically penetrated and that is connected with the top tube at a front side and with the seat stay at a rear side.

6. The bicycle frame of claim 5, wherein one of the plurality of lugs comprises a seat stay lug that connects a rear end of the seat tube lug and a front end portion of the seat stay.

7. The bicycle frame of claim 6, wherein the seat stay lug comprises a seat stay lug upper plate and a seat stay lug lower plate that is bonded to the seat stay lug upper plate.

8. The bicycle frame of claim 6, wherein one hole is formed at a front side of the seat stay lug, the hole being bonded to the seat tube lug, and another hole formed at a rear side of the seat stay lug and corresponding to a front end portion of the seat stay.

9. The bicycle frame of claim 1, wherein the bottom lug comprises a bottom lug left plate and a bottom lug right plate that is bonded to the bottom lug left plate.

10. The bicycle frame of claim 1, wherein the at least two plates are butt bonded or welded in a partially overlapped state.

11. A bicycle frame having a plurality of lugs connected with a plurality of tubes, wherein the plurality of lugs are produced by shaping and vertically or laterally bonding at least two plates, wherein the plurality of tubes comprise a head tube, a top tube, a down tube, a seat tube, a chain stay, and a seat stay;

wherein one of the plurality of lugs comprises a bottom lug connected with a lower end of the seat tube, a rear end of the down tube, and with the chain stay at a rear side;

wherein the bicycle frame further comprises a chain stay lug that connects the rear side of the bottom lug and a front end portion of the chain stay; and wherein one hole is formed at a front side of the chain stay lug, the hole being bonded to the bottom lug, and two further holes formed at a rear side of the chain stay lug and corresponding a front end portion of the chain stay.

12. The bicycle frame of claim 11 further comprising an exterior diameter reduction portion having a reduced exterior diameter, and an insertion portion that is inserted into the tube formed in an end portion of the exterior diameter reduction portion.

* * * * *